United States Patent
Lambrecht

(10) Patent No.: US 10,179,599 B1
(45) Date of Patent: Jan. 15, 2019

(54) PAPER AND/OR PHONE HOLDER ACCESSORY FOR A SHOPPING CART

(71) Applicant: Russell Lee Lambrecht, Las Vegas, NV (US)

(72) Inventor: Russell Lee Lambrecht, Las Vegas, NV (US)

( * ) Notice: Subject to any disclaimer, the term of this patent is extended or adjusted under 35 U.S.C. 154(b) by 0 days.

(21) Appl. No.: 15/927,039

(22) Filed: Mar. 20, 2018

Related U.S. Application Data

(60) Provisional application No. 62/543,250, filed on Aug. 9, 2017.

(51) Int. Cl.
  *B62B 3/00* (2006.01)
  *B62B 3/14* (2006.01)

(52) U.S. Cl.
  CPC .......... *B62B 3/1468* (2013.01); *B62B 3/1428* (2013.01); *B62B 3/002* (2013.01); *B62B 2202/64* (2013.01)

(58) Field of Classification Search
  CPC .... B62B 3/1408; B62B 3/1416; B62B 3/1424
  See application file for complete search history.

(56) References Cited

U.S. PATENT DOCUMENTS

| | | | |
|---|---|---|---|
| 2,888,761 A | 6/1959 | Miller | |
| 3,539,204 A | 11/1970 | Keller | |
| 3,993,319 A | 12/1976 | Day | |
| 4,156,318 A | 5/1979 | Economy | |
| 4,423,888 A | 1/1984 | Addison | |
| 4,968,047 A * | 11/1990 | Ferris | B62B 3/1408 248/302 |
| 4,988,025 A | 1/1991 | Lipton et al. | |
| 5,086,960 A * | 2/1992 | Schwietzer | B62B 3/1428 224/277 |
| 6,299,119 B1 | 10/2001 | Dunning | |
| 6,453,588 B1 | 9/2002 | Lykens | |
| 7,219,822 B2 | 5/2007 | Chretien et al. | |
| 7,681,344 B2 | 3/2010 | Crum | |
| 7,895,777 B2 | 3/2011 | Crum | |
| 8,336,774 B2 | 12/2012 | Crum | |
| 8,727,214 B2 | 5/2014 | Crum | |
| 8,789,733 B2 | 7/2014 | Zhang | |
| 8,905,305 B2 | 12/2014 | Crum | |
| 8,931,744 B1 | 1/2015 | McLafferty | |
| 9,053,510 B2 | 6/2015 | Crum | |
| 9,126,616 B2 | 9/2015 | Crum | |

(Continued)

*Primary Examiner* — Bryan A Evans
(74) *Attorney, Agent, or Firm* — Connie R. Masters

(57) ABSTRACT

A holder accessory for a handlebar of a shopping cart is provided that includes a platform and two securing members that are attachable around and aligned with a horizontal cart push bar portion and a cart transverse portion of the shopping cart handlebar. The transverse securing member provides cantilevered support for the platform, while the push bar securing member is angularly offset from and generally oriented perpendicularly from the push bar securing member to provide support against lateral forces. A stem extends from the underside of the platform to the transverse securing member to hold the platform at a suitable angle for use. Optionally, but preferably, the platform includes a lower ledge upon which a mobile phone, paper, or pen may be rested and an upper retention member to temporarily hold or fasten paper to the platform.

18 Claims, 4 Drawing Sheets

(56) References Cited

U.S. PATENT DOCUMENTS

2004/0251289 A1* 12/2004 Chretien .............. B62B 3/1428
224/411
2013/0341370 A1 12/2013 Larson

* cited by examiner

PAPER AND/OR PHONE HOLDER ACCESSORY FOR A SHOPPING CART

CROSS-REFERENCE TO RELATED APPLICATIONS

This nonprovisional application claims the benefit of U.S. Provisional Patent Application Ser. No. 62/543,250, filed on Aug. 9, 2017, which is incorporated herein in its entirety.

FIELD OF INVENTION

This invention relates generally to accessories specially adapted for hand carts, and, more particularly, to a holder accessory for mounting onto a shopping cart that has an angled support platform that accommodates papers, notepads, and/or mobile phones.

BACKGROUND OF THE INVENTION

Shoppers at retail stores often prepare a list of items to be purchased. This shopping list may be brought to the store in paper form or in digital form, such as on a mobile phone, either of which may allow the shopper to be reminded of needed items and to check off the various items as they are placed in the cart. At other times, a shopper may desire to use his or her phone while shopping for other purposes (such as sending and receiving text messages). However, shopping carts do not provide any holder or planar surface for a paper list or a mobile phone. Instead of a planar surface, a typical shopping cart has a handlebar with a horizontal tubular push bar (usually covered by a cart handgrip) rearward of the shopping cart basket that extends the width of the cart, which is used by the shopper to push and direct the cart.

It is inconvenient for the shopper that no part of the shopping cart provides a suitable location for resting a paper or holding a mobile phone efficiently. Because of this lack of a usable stand or holder, the shopping list (whether on paper or the mobile phone) must be held in the hand and must be continuously repositioned into an in-use position as the shopper looks at the list, into a storage position while the shopper obtains the item from the shelf and places the item in the cart, and back into the in-use position as the shopper checks the item off the list. Consequently, over the years it has been realized that it would be advantageous to provide a support for a paper shopping list, and many and various devices have been proposed as shopping cart-attachable stands to hold such a paper list.

Some of the proposed devices are temporarily attachable to the push bar of the shopping cart, to the child seat, or to both the cart push bar portion and the back edge of the conventional child seat, such as shown in U.S. Pat. No. 4,496,058 issued to Harris, et al. in 1985. These temporarily attachable devices must be brought to the store by the shopper, so are not conveniently available for use without forethought.

Many of the proposed devices block all or part of the child seat making the seat unusable for its purpose, which is undesirable. Some of these devices extend between the cart push bar and the bar at the back of the child seat, such as disclosed in U.S. Pat. No. 5,566,609 issued to Kirschner on Oct. 22, 1996. Others are centrally attached to the push bar and extend into the child seat, such as the devices disclosed in U.S. Pat. No. 5,086,960 issued to Schwietzer in 1992, U.S. Pat. No. 2,888,761 issued to Miller in 1958, U.S. Pat. No. 6,453,588 issued to Lykens in 2002, and U.S. Patent Publication No. 20110221149 by Crum.

Additionally, some of the proposed devices are complex (U.S. Pat. No. 4,988,025 issued to Lipton, et al. in 1991; U.S. Patent Publication No. 20110221149 by Crum), have articulation points (U.S. Pat. No. 5,086,960 issued to Schwietzer in 1992), or may be costly to manufacture and may not be durable and robust.

Furthermore, most of the disclosed paper and phone holder accessory devices for shopping carts are only designed for paper lists and are not suitable for holding a mobile phone in a usable position.

Thus, though the crowded field indicates the felt need for a holder accessory for a shopping cart, none of the numerous disclosed devices provides a support usable for a paper (such as shopping lists, sales advertisements, coupons, or the like) or a mobile phone; provides a suitable support that does not interfere with the space allocated for the child seat; has no articulation points, thus increasing durability; is permanently affixed to the shopping cart for convenience of use; and is not complex with multiple interlocking parts, but is simple and straightforward to manufacture. Therefore, the paper and phone holder accessory for a shopping cart of the present invention substantially departs from the conventional concepts and designs of the prior art and, in doing so, fulfills this need.

The discussion above is merely provided for general background information and is not intended to be used as an aid in determining the scope of the claimed subject matter.

BRIEF SUMMARY OF THE INVENTION

The present invention is directed to a paper and phone holder accessory for a shopping cart that is permanently or semi-permanently attachable to both the horizontal cart push bar portion of the handlebar of a shopping cart and to the transverse bar portion of the handlebar of a shopping cart, and that is designed and structured to receive, support, hold, or otherwise accommodate a paper (such as a shopping list, a notepad, a sales advertisement, coupons, or the like) and/or a mobile phone. The term "mobile phone," is used throughout the application for clarity of discussion, but is herein to be broadly interpreted to mean any electronic device that a shopper might bring to a store, including a phone, external battery, cellular hot spot, mp3 player, tablet computer, language translators, or other similar electronic device that the shopper may carry into a retail establishment and may wish to rest on the holder accessory.

The shopping cart paper/phone holder accessory comprises an angled platform with a planar top surface disposed at a suitable angle for use and two securing members, a push bar securing member and a transverse bar securing member, that together permanently or semi-permanently attach the holder accessory to the shopping cart. The transverse bar securing member provides the cantilevered support for the platform while the secondary push bar securing member, angularly offset from and generally oriented perpendicularly with respect to the transverse bar securing member, provides support against lateral forces directed against the platform.

The platform optionally, but preferably, includes a ledge extending upwardly on or near the proximal (proximal to the shopper) edge of the platform upon which a mobile phone or paper may be rested and, optionally, but preferably, includes a retention member on or near the distal edge of the platform to temporarily hold, secure, or fasten a paper or electronic item to the platform. The combination of the lower ledge and the upper retention member increases versatility by enabling the accommodation of either paper or an electronic device, either of which is supported at a suitable angle; this versatility is not provided by prior art devices.

In contrast to many of the prior art devices, the present shopping cart accessory is positioned to be usable by the shopper but does not inhibit use of the child seat of the shopping cart, because the holder accessory is disposed to the side of the child seat. The holder accessory is attached to and aligned over one of the transverse bars at the side of the handlebar, which are typically substantially perpendicular to the cart push bar portion and are to the side of the child seat. This positioning to the side over the transverse bar allows the shopping carts to which the holder accessory is attached to be rolled together and tandem stacked. Though the holder accessory can be aligned over either the right or left transverse bar, the accessory is discussed herein as aligned over the right transverse bar (to the shopper's right), since a great majority of people are righthanded.

The present shopping cart accessory is formed without articulation points. This reduces the complexity and increases the sturdiness of the accessory, which is advantageous because shopping carts are often subjected to the elements and to harsh treatment.

In one aspect of the present invention, the push bar securing member and the transverse bar securing member are separate and not joined to each other.

In another aspect of the present invention, the push bar securing member is joined to the transverse bar securing member via a rounded approximately ninety-degree curved member.

In a further aspect of the present invention, the retention member disposed on or near the distal edge of the platform is a spring clip.

In another aspect of the present invention, the retention member disposed on or near the distal edge of the platform is a quick-grip order holder-type clip.

In an additional aspect of the present invention, the push bar securing member extends along the cart push bar portion only to the existing cart handgrip substantially covering the cart push bar portion.

In another aspect of the present invention, the push bar securing member extends approximately the length of the cart push bar portion and incorporates an accessory handgrip for covering the cart push bar portion.

In a further aspect of the present invention, a retention member is disposed at or near the distal end of the platform.

In an additional aspect of the present invention, no retention member is disposed at or near the distal end of the platform.

In another aspect of the present invention, an upwardly extending ledge is disposed at or near the proximal end of the platform.

An object of the present invention is to provide a holder accessory for a shopping cart that can support or hold a paper and/or a mobile phone.

Another object of the present invention is to provide a paper and phone holder accessory for a shopping cart that includes a flat surface oriented at an angle usable by a shopper.

An additional object of the present invention is to provide a paper and phone holder accessory for a shopping cart that does not preclude the use of the child seat at the rear of the shopping cart.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Shown throughout the figures, the present invention is directed toward a paper and/or phone holder accessory for a handlebar of a shopping cart that provides a support or stand that is positioned at an angle and at a location that is convenient for use by the shopper pushing the shopping cart and that is situated to the side of the cart so as to not interfere with the tandem stacking of the shopping carts by the retail establishment and so as to not interfere with usage of the centrally-located child seat of the shopping cart.

Figure 1:
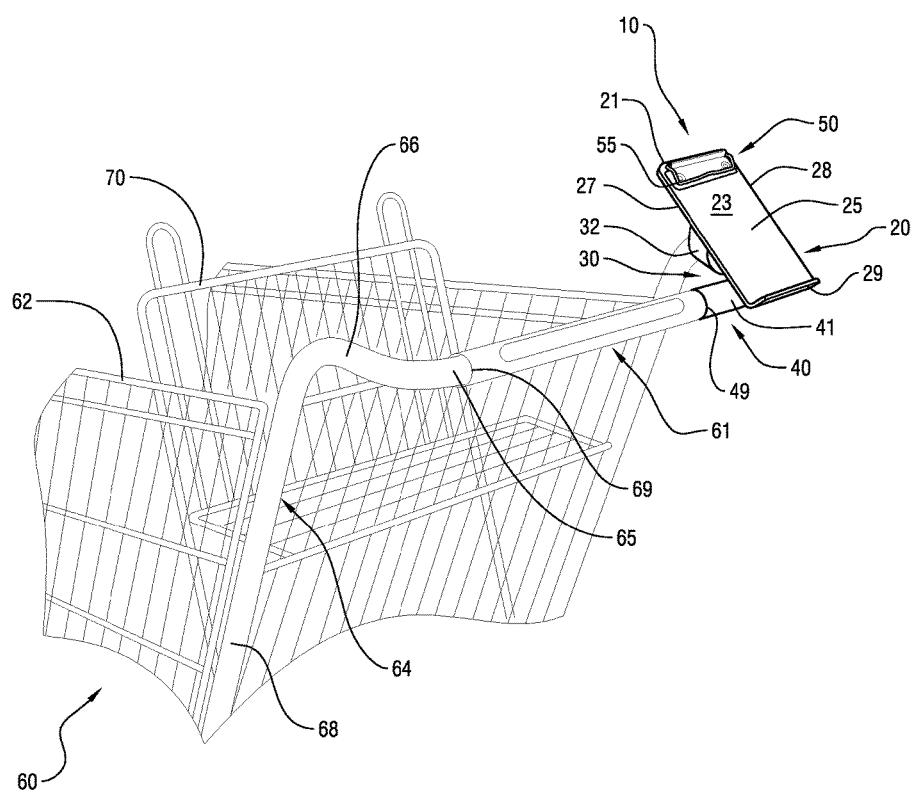
FIG. 1 is a perspective view of an embodiment of the paper and/or phone holder accessory for a shopping cart of the present invention in the environment of use attached to the handlebar of a shopping cart.

Referring now to FIG. 1, a paper and/or phone holder accessory for a shopping cart, shown generally as reference number 10, is illustrated in accordance with a preferred embodiment of the present invention. As shown, the holder accessory 10 comprises an angled platform 20 that is attached to the handlebar 64 of the shopping cart 60 by two securing members 30, 40 (a transverse bar securing member 30 and a push bar securing member 40).

FIG. 1 shows the holder accessory 10 installed onto a conventional shopping cart 60 having conventional shopping cart elements. The cart handlebar 64 for driving and steering the shopping cart 60 (to which the holder accessory 10 is designed to be attached) is disposed rearward of the basket 62. The handlebar 64 is typically a tubular structure that includes a horizontal, cylindrical cart push bar portion 65, a right and a left transverse bar portion 66, and a right and a left generally vertical bar portion 68. The horizontal cart push bar portion 65 extends the width of the cart 60 and is typically disposed a few inches behind the cart basket 62, which often incorporates a rear child seat 70. The cart push bar portion 65 is typically covered with a cart handgrip 61 that is grasped by the shopper. The tubular cart push bar portion 65 has right and left ends that are attached to the right and left tubular cart transverse bar portions 66. The cart transverse bar portions 66 extend forward from the right and left ends of the cart push bar portion 65, respectively, to join the upper ends of the right and left tubular vertical bar portions 68. The right and left vertical bar portions 68 extend from the right and left cart transverse bar portions 66 down the right and left rear corners of the shopping cart basket 62, respectively. Customarily, the cart push bar portion 65, both cart transverse bar portions 66, and both vertical bar portions 68 are formed of a single piece of metal tubing.

Figure 4:
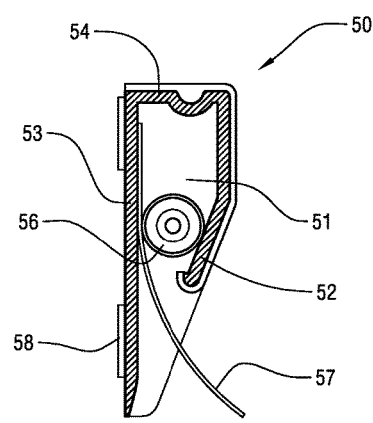
FIG. 4 is a side cut view of the retention member 50 of the embodiment of FIG. 3 of the holder accessory of the present invention.

The support platform 20 of holder accessory 10 has a planar top surface 23 upon which the paper shopping list 57 (FIG. 4) or the mobile phone (not shown) may rest and has an underside, back 22 (FIG. 2), onto which both securing members 30, 40 are fixed attached or with which both securing members 30, 40 are integrally formed. The platform 20 is positioned above and aligned with the transverse bar portion 66 (preferably the center 25 of the platform 20 is substantially aligned with the center of the transverse bar portion 66) and is oriented at an easy-to-use angle, such as an angle of 25 to 70 degrees from horizontal.

The support platform 20 is sized to accommodate a mobile phone and/or a paper. The support platform 20 extends from left side 27 to right side 28 a width of preferably from 3 to 8 inches and most preferably a width of from 4 to 5.5 inches. The support platform 20 extends from the lower proximal edge (proximal to the shopper, which is the edge to which the ledge 29 is attached) to the upper distal edge 21 (distal to the shopper). This length is preferably from 4 to 11 inches and is most preferably 6 to 7.5 inches in length.

The distal portion of the support platform 20 is preferably configured with an upper or distal retention member 50 that serves to hold, clamp, or otherwise retain an inserted item between the retention member 50 and the top surface 23 of the platform 20. The retention member 50 may be designed to receive only thin inserted materials (such as paper shopping lists, coupons, store advertisements, or the like) or may be designed to accommodate both thin inserted materials and thicker inserted materials (such as notepads, mobile phones, mobile phone cases, other electronic devices, and the like). One or more of any type of conventional retention member 50 may be used, as is known or becomes known in the art. In one aspect shown in FIG. 1, the upper retention member 50 is a spring clip 55 (FIG. 1), for example the type of spring clip that is typically found on a clipboard. In another aspect shown in FIGS. 3 and 4, the retention member 50 is a quick-grip clip with an internal roller grip 56, such as is used as a restaurant order holder. The quick-grip order holder-type clip has a front portion 52, an upper portion 54, a back portion 53 that together define an interior space 51 into which the roller grip 56 is suspended. Particularly, the lower angled part of the front portion 52 assists in maintaining the roller grip 56 within the interior space 51. When paper 57 is inserted, the roller grip 56 is pushed slightly upwardly into the larger upper interior space 51, with the roller grip 56 then pulled downwardly slightly by gravity to hold the inserted paper 57 in place. The back portion 53 (FIG. 4) of either the spring clip type retention member 50 or of the quick-grip clip retention member 50 may be permanently adhered via a permanent affixing medium 58 (such as adhesive, glue, welding, or the like) to the front surface 23 of the support platform 20. Alternatively, the back portion 53 may be formed integrally with the platform 20. The retention member 50 is disposed within the top 25% of the top, distal end of platform 20 and preferably at or near the distal end of platform 20.

The proximal portion of the support platform 20 is preferably configured with a ledge 29 that functions as a prop or support upon which to rest or brace the paper and/or mobile phone or the like. The ledge 29 may be a lip, ledge, flange, rolled edge, or other projection that extends outwardly at or near the proximal edge of platform 20. The ledge 29 may be formed of a single member that extends over half the width of the platform 20 or, preferably, that extends substantially the width of the platform 20. Optionally, the ledge 29 may be formed of multiple members that together form an upwardly extending prop for a phone or may be formed of a single member with apertures, such as a ledge formed of a lattice design. The ledge 29 forms an angle with the platform 20 that is sufficient to allow the phone or paper to rest on the front of the platform 22. Preferably the ledge 29 forms an angle with the front surface 23 of platform 20 of from 80 degrees to 120 degrees. The ledge 29 extends outwardly and upwardly a sufficient distance to allow the shopper to position the lower edge of the paper or mobile phone against the ledge 29 and with the back of the paper or mobile phone braced against surface 23. The distance the ledge 29 extends from the top surface 23 is preferably in the range of from 0.20 to 1.5 inches.

The platform 20, ledge 29, and the retention member 50 preferably have rounded corners and edges to prevent injuries to shoppers or to a child seated in the nearby child seat.

The angled platform 20 of the support platform accessory 10 is permanently or semi-permanently secured to the shopping cart handlebar 64 at a usable angle via the transverse bar securing member 30 that secures the platform to the transverse bar portion 66 and the push bar securing member 40 that secures the platform to the cart push bar portion 65. This angle may vary based on the design of the particular shopping cart to which the holder accessory 10 is to be attached.

Figure 2:
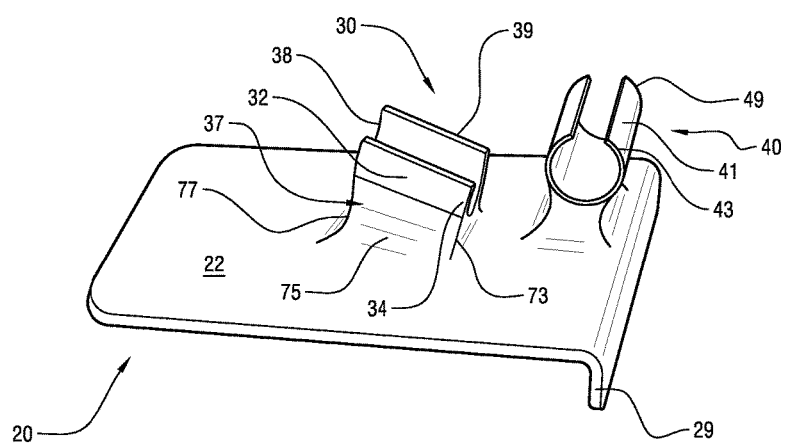
FIG. 2 is a bottom view of an embodiment of the paper and/or phone holder accessory for a shopping cart of the present invention in which the transverse bar securing member and push bar securing member are separate.
Figure 3:
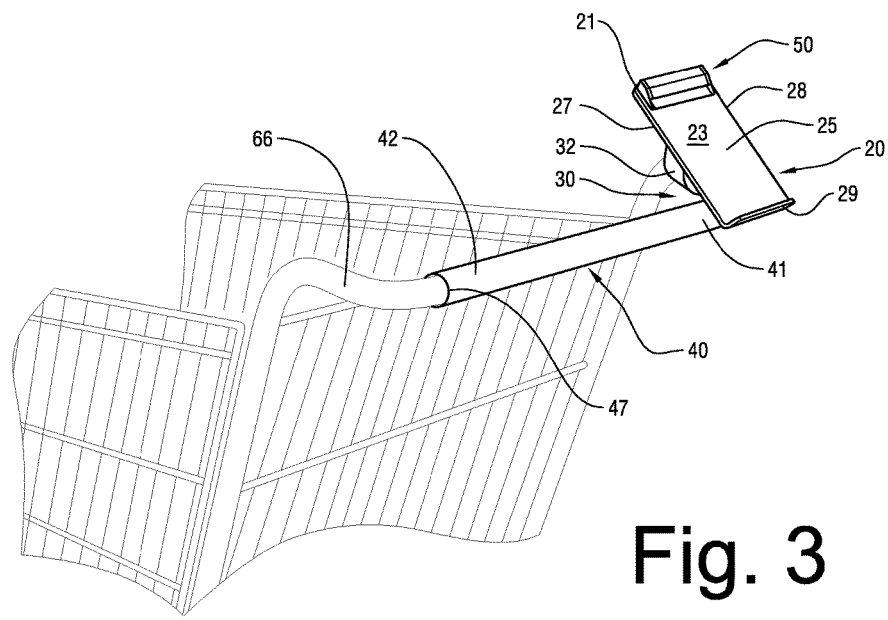
FIG. 3 is a perspective view of an embodiment of the paper and/or phone holder accessory for a shopping cart of the present invention in the environment of use attached to the handlebar of a shopping cart.
Figure 5:
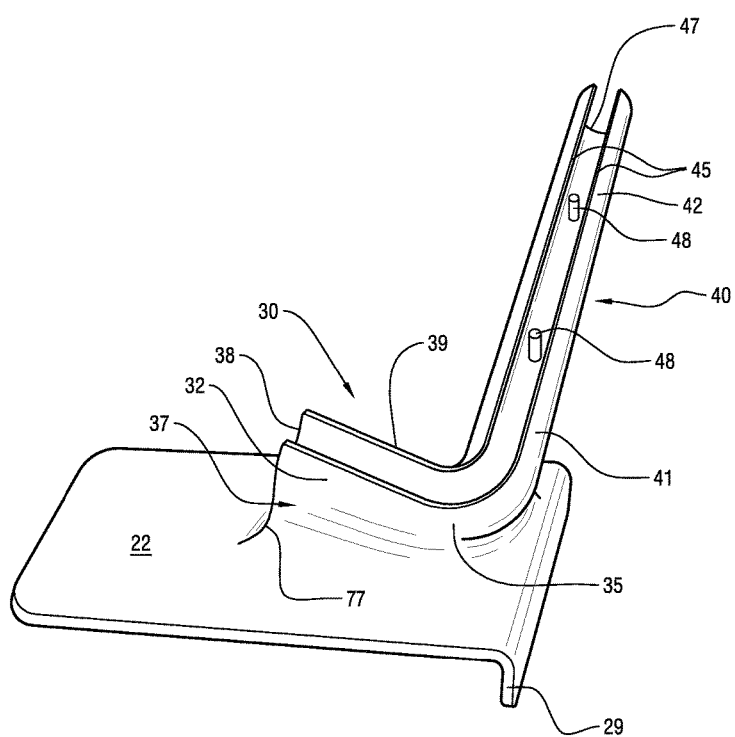
FIG. 5 is a bottom view of an embodiment of the present invention in which the transverse bar securing member and push bar securing member are joined via a rounded approximately ninety-degree member.

The push bar securing member 40 may be shorter, as seen in the first embodiment of FIGS. 1-2, or longer, as seen in the second embodiment of FIGS. 3, 5. The shorter push bar securing member 40 is suitable for use with a shopping cart with a separate cart handgrip 61, such as a cart handgrip already installed on the cart. For example, the shorter push bar securing member 40 may suitably be used to retrofit shopping carts already in the retailer's possession, thereby allowing the retailer to provide the advantages of the holder accessory 10 to its customers without removing a pre-existing cart handgrip 61. The longer push bar securing member 40 incorporates an integral accessory handgrip, which may be formed unitarily. The longer push bar securing member 40 may be preferred by shopping cart manufacturers or by retailers who have shopping carts without installed cart handgrips or with damaged cart handgrips.

As seen in the first embodiment of FIGS. 1-2, the push bar securing member 40 includes a first horizontal member 41 that is attached to the proximal (to the shopper) portion of the back 22 of platform 20 and is aligned with the cart push bar portion 65. This push bar-aligned first member 41 comprises a push bar semi-cylindrical member, which is an incomplete tubular structure that is configured to fit over or clamp onto the upper portion of the tube forming cart push bar portion 65. Thus, the interior diameter of the push bar securing member 40 is slightly greater than the exterior diameter of the cart push bar portion 65 to allow the push bar securing member 40 to fit over the exterior of the tubular cart push bar portion 65. The first horizontal member 41 extends from outer edge 43 to inner edge 49. The first horizontal member 41 is at least 2.0 inches long from outer edge 43 to inner edge 49 and may be longer based on the specifications of the separate handgrip 61.

As seen in the second embodiment of FIGS. 3, 5, which provides a longer push bar securing member 40, the first horizontal member 41 is extended to include an elongated horizontal portion 42 that forms an accessory handgrip. The elongated horizontal portion 42 is fixedly attached to, or formed integrally with, the first horizontal member 41. The longer push bar securing member 40 of this aspect of the invention extends substantially across the cart push bar portion 65 to left edge 47 to form the accessory handgrip. The interior surface of the elongated horizontal member 42 is configured with pegs 48 (FIG. 5) that are configured to fit into receiving holes of a conventional cart push bar portion 65. (In conventional shopping carts, pegs 48 are typically used to permanently or semi-permanently attach the hand-protective cart handgrip 61 over the tubular metal of cart push bar portion 65.) The pegs 48 are pin-like protuberances extending outwardly from the interior surface of the elongated horizontal member 42. The elongated horizontal portion 42 firmly attaches the push bar securing member 40 to the conventional cart push bar portion 65 and replaces the standard hand-protective cart handgrip 61 that is typically disposed over the metal tube of cart push bar portion 65. The accessory handgrip formed by the elongated horizontal portion 42 of the transverse bar securing member 40 has an outer surface that is suitable for grasping by the shopper's hands. The horizontal portions 41, 42 of the push bar securing member 40 may be formed integrally with the platform 20 or fixedly attached. Optionally, either or both of the horizontal portions 41, 42 may have a neck to distance them slightly from the back of the platform 20 if needed to accommodate the particular design of the shopping cart to which the holder accessory 10 will be attached.

Turning to the second securing member, the transverse bar securing member 30 is aligned with the transverse portion 66 of the cart handlebar 64. Typically, the transverse bar securing member 30 is oriented substantially perpendicularly to the transverse bar securing member 40, but the angle between the securing members 30, 40 may vary somewhat based on the design of the handlebar of the particular shopping cart to which the holder accessory 10 is to be attached.

The transverse bar securing member 30 is attached distal (further from the shopper) of the push bar securing member 40; it is preferably attached to the mid-lower to middle portion of the back 22 of platform 20 with the push bar securing member 40 disposed at the proximal (lower) or mid-lower portion of back 22. The transverse bar securing member 30 includes both a semi-cylindrical transverse member 32 and a stem 37 portion. The semi-cylindrical transverse portion 32, like the push bar securing member 40, is formed of an incomplete tubular structure that is configured to fit over the upper portion of the tube of the transverse handlebar portion 66. Therefore, the interior diameter of semi-cylindrical transverse member 32 is slightly greater than the exterior diameter of the transverse handlebar portion 66 to allow the semi-cylindrical transverse member 32 to fit over the exterior of the tubular transverse handlebar portion 66. The partial tubular structure of semi-cylindrical transverse portion 32 has an opening defined by edges 39 and an opposing closed side fixedly attached to stem 37. The semi-cylindrical transverse member 32 extends from lower or proximal edge 34 to upper or distal edge 38.

The securing members 30, 40 have a semi-cylindrical structure in which a hollow right cylinder body or tube has a cylinder segment removed to allow insertion of the cart push bar portion 65 or the transverse handlebar portion 66, respectively. The opening (defined by edges 39, 45) formed in the hollow cylinder body by the removal of the cylinder segment is sufficiently large to allow the insertion of the tubular handlebar portions, but sufficiently small to retain the securing members 30, 40 to the handlebar. For example, the cylinder segment angle is less than 180 degrees and more than 45 degrees.

To elevate the distal portion of the support platform 20, a stem 37 extends vertically between the back surface 22 of the platform 20 and the top of the semi-cylindrical transverse member 32. In FIG. 2, the stem 37 extends horizontally between a proximal edge 73 and a distal edge 77. Stem 37 has a vertical height at distal edge 77 that is greater than the vertical height at the opposing proximal edge 73, which enables the platform 20 to be supported at an angle. Stem 37 may be formed integrally with the back of platform 20 or may be formed separately and fixedly attached. Similarly, the semi-cylindrical transverse member 32 may be formed separately or integrally with the stem 37.

In one aspect of the invention, shown in FIG. 2, the transverse bar securing member 30 and the push bar securing member 40 are separate (not directly connected) and are attached separately to the back of platform 20.

In another aspect of the invention, shown in FIG. 5, the transverse bar securing member 30 and the push bar securing member 40 are joined by curved securing member 35. The curved member 35, like the semi-cylindrical transverse member 32 and the push bar securing member 40, is formed of a partial or semi-cylindrical tubular structure. However, in contrast to the straight semi-cylindrical transverse member 32 and the straight push bar securing member 40, the curved member 35 forms a rounded angle, with the pre-determined angle governed by the particular handlebar design, which is typically approximately 90 degrees. The curved member 35 is joined to the semi-cylindrical transverse member 32 at approximately the location of the end 34 in the first aspect shown in FIG. 2 and is joined to the push bar securing member 40 at approximately the location of outer edge or end 43 in the first aspect shown in FIG. 2. Thus, the combination of the push bar securing member 40, the curved member 35, and the transverse bar securing member 30 follows the curve of the shopping cart handle bar, which varies based on the specific shopping cart design. The curved member 35 may be formed integrally with the transverse bar securing member 30, the push bar securing member 40, and the platform 20 or may be formed separately and fixedly attached.

As in the first aspect, the stem 37 is attached to the bottom of platform 20 and extends downwardly from the bottom with the proximal portion extending downwardly to a lesser degree than the distal stem portion. This serves to support the distal end of the platform 20 at an upward angle suitable for use by the shopper.

The elements of the holder accessory 10 may be formed of metal or plastic or may be formed of both metal and plastic. For durability, the two bar securing members 30, 40 may be preferably wholly or partially made of metal. The extending horizontal member 42, stem 37, and platform 20 may be formed of metal or plastic material.

To install the first embodiment of the holder accessory 10 (in which the push bar securing member 40 is shorter and there is a pre-existing cart handgrip 61) onto a conventional shopping cart, the horizontal member 41 of the push bar securing member 40 is positioned over the right side of cart push bar portion 65 (to the right of the pre-installed cart handgrip 61) as the transverse bar securing member 30 is positioned over the transverse bar 66. The two securing members 30, 40 are then pushed downward onto the cart handlebar 64 and engaged. Though the holder accessory 10 is designed to remain on the cart, if the accessory 10 becomes damaged, the accessory 10 may be pulled upward to be removed and replaced.

To install the second embodiment of the holder accessory 10 (in which the push bar securing member 40 incorporates an accessory handgrip 42) onto a conventional shopping cart, the horizontal member 41 including accessory handgrip 42 of the push bar securing member 40 is positioned over the cart push bar portion 65 as the transverse bar securing member 30 is positioned over the cart transverse bar 66. The pegs 48 are aligned with receiving holes (not shown) within the cart push bar portion 65, the push bar securing member 40 is snapped into place with the pegs received by the receiving holes, and the transverse bar securing member 30 is snapped over the transverse bar 66. However, if replacement is needed, such as due to damage, with sufficient force the pegs 48 can be broken off and the securing members 30, 40 can be disengaged from the transverse bar 66 and the cart push bar portion 65. After removal of the damaged holder accessory 10, a new holder accessory 10 can be installed.

When installed, the holder accessory 10 does not interfere with the tandem stacking of multiple shopping carts, such as for storage or transport of a line of shopping carts, at least because of the positioning to the side of the cart 60 and the lack of interference with the child seat 70.

To use the holder accessory 10, a shopper selects a cart 60 fitted with an accessory holder 10 with the platform 20 positioned to the side of the cart 60. If the shopper has a paper list, the paper is positioned on the platform 20 and is manually inserted into the retention member 50 where it is releasably retained while in use. The shopper may check off items using the platform 20 as a writing surface and may rest a pen or pencil on ledge 29. If the shopper has a mobile phone, the mobile phone may be rested on the platform 20 with the bottom supported by the ledge 29. Optionally, the retention member 50 may further secure the mobile phone. Without continuously repositioning the paper list or mobile phone from an in-use position to a storage position and back to an in-use position, the paper list or mobile phone is held in a viewable and conveniently accessible position while the shopper maneuvers the shopping cart 60 around the store. The shopper may be reminded of needed items, may check off items, or may use the features of the mobile phone (such as reading or sending texts, using the calculator, or checking needed items off lists).

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A holder accessory for a shopping cart handlebar, the holder accessory comprising:
    a support platform having a substantially planar upper surface, a proximal edge, a distal edge, a right lateral edge, a left lateral edge, and an underside having an underside proximal portion; wherein said shopping cart handlebar comprises a cart push bar portion and two opposing cart transverse bar portions; wherein said support platform comprises a retention member disposed at or near said distal edge of said support platform; and wherein said retention member comprises a spring clip;
    a push bar securing member fixedly attached to said underside proximal portion and attachable around said cart push bar portion of said handlebar; and
    a transverse bar securing member fixedly attached to said underside of said support platform at a location distal to the location of attachment of said push bar securing member and attachable around one of said opposing cart transverse bar portions of said shopping cart handlebar.

2. A holder accessory for a shopping cart handlebar, the holder accessory comprising:
    a support platform having a substantially planar upper surface, a proximal edge, a distal edge, a right lateral edge, a left lateral edge, and an underside having an underside proximal portion; wherein said shopping cart handlebar comprises a cart push bar portion and two opposing cart transverse bar portions;
    a push bar securing member fixedly attached to said underside proximal portion and attachable around said cart push bar portion of said handlebar; and
    a transverse bar securing member fixedly attached to said underside of said support platform at a location distal to the location of attachment of said push bar securing member and attachable around one of said opposing cart transverse bar portions of said shopping cart handlebar; wherein said transverse bar securing member is not directly connected to said push bar securing member.

3. A holder accessory for a shopping cart handlebar, the holder accessory comprising:
    a support platform having a substantially planar upper surface, a proximal edge, a distal edge, a right lateral edge, a left lateral edge, and an underside having an underside proximal portion; wherein said shopping cart handlebar comprises a cart push bar portion and two opposing cart transverse bar portions;
    a push bar securing member fixedly attached to said underside proximal portion and attachable around said cart push bar portion of said handlebar;
    a transverse bar securing member fixedly attached to said underside of said support platform at a location distal to the location of attachment of said push bar securing member and attachable around one of said opposing cart transverse bar portions of said shopping cart handlebar; and
    a curved securing member disposed between and directly connecting said transverse bar securing member and said push bar securing member; wherein said curved securing member comprises a semi-cylindrical transverse member; and wherein said curved securing member forms a generally ninety-degree angle.

4. A holder accessory for a shopping cart handlebar, the holder accessory comprising:
    a support platform having a substantially planar upper surface, a proximal edge, a distal edge, a right lateral edge, a left lateral edge, and an underside having an underside proximal portion; wherein said shopping cart handlebar comprises a cart push bar portion and two opposing cart transverse bar portions;
    a push bar securing member fixedly attached to said underside proximal portion and attachable around said cart push bar portion of said handlebar; and a transverse bar securing member fixedly attached to said underside of said support platform at a location distal to the location of attachment of said push bar securing member and attachable around one of said opposing cart transverse bar portions of said shopping cart handlebar; wherein said transverse bar securing member comprises a transverse stem member and a semi-cylindrical transverse member, wherein said transverse stem member is fixedly attached to said underside of said support platform and fixedly attached to said semi-cylindrical transverse member.

5. The holder accessory for a shopping cart handlebar as recited in claim 4, wherein said transverse stem member comprises a stem proximal edge and a stem distal edge; wherein the distance said stem distal edge extends from said underside is greater than the distance said stem proximal edge extends from said underside, whereby said support platform is positioned at an angle.

6. The holder accessory for a shopping cart handlebar as recited in claim 4, wherein said semi-cylindrical transverse member comprises a partial tubular structure having an opening defined by opening edges and comprises an opposing closed side, wherein said opening accommodates one of said opposing cart transverse bar portions of said handlebar; and wherein said opposing closed side is fixedly attached to said transverse stem member.

7. A holder accessory for a shopping cart handlebar, the holder accessory comprising:
  a support platform having a substantially planar upper surface, a proximal edge, a distal edge, a right lateral edge, a left lateral edge, and an underside having an underside proximal portion; wherein said shopping cart handlebar comprises a cart push bar portion and two opposing cart transverse bar portions;
  a push bar securing member fixedly attached to said underside proximal portion and attachable around said cart push bar portion of said handlebar; wherein said push bar securing member extends along substantially the length of said cart push bar portion to form an accessory handgrip; and
  a transverse bar securing member fixedly attached to said underside of said support platform at a location distal to the location of attachment of said push bar securing member and attachable around one of said opposing cart transverse bar portions of said shopping cart handlebar.

8. A holder accessory for a shopping cart handlebar in which the cart handlebar has a cart push bar portion and opposing cart transverse bar portions, the holder accessory comprising:
  a support platform having a substantially planar upper surface, a proximal edge, a distal edge, a right lateral edge, a left lateral edge, and an underside; wherein said support platform comprises an upwardly extending ledge disposed at or near said proximal edge; wherein said support platform further comprises a retention member disposed at or near said distal edge of said platform;
  a push bar securing member fixedly attached to a proximal portion of said underside of said support platform and comprising a semi-cylindrical push bar member that is attachable around said cart push bar portion of said handlebar; and
  a transverse bar securing member comprising a transverse stem member and a semi-cylindrical transverse member; wherein said transverse stem member is fixedly attached to said underside of said support platform at a location distal to the location of attachment of said push bar securing member; wherein said semi-cylindrical transverse member is attachable around one of said opposing cart transverse bar portions of said handlebar; wherein said transverse stem member comprises a stem proximal edge and a stem distal edge; wherein the distance said stem distal edge extends from said underside is greater than the distance said stem proximal edge extends from said underside to support said platform at an angle; and wherein said transverse bar securing member is not directly connected to said push bar securing member.

9. A holder accessory for a shopping cart handlebar in which the cart handlebar has a cart push bar portion and opposing cart transverse bar portions, the holder accessory comprising:
  a support platform having a substantially planar upper surface, a proximal edge, a distal edge, a right lateral edge, a left lateral edge, and an underside; wherein said support platform comprises an upwardly extending ledge disposed at or near said proximal edge; wherein said support platform further comprises a retention member disposed at or near said distal edge of said platform;
  a push bar securing member fixedly attached to a proximal portion of said underside of said support platform and comprising a semi-cylindrical push bar member that is attachable around said cart push bar portion of said handlebar;
  a transverse bar securing member comprising a transverse stem member and a semi-cylindrical transverse member; wherein said transverse stem member is fixedly attached to said underside of said support platform at a location distal to the location of attachment of said push bar securing member; wherein said semi-cylindrical transverse member is attachable around one of said opposing cart transverse bar portions of said handlebar; wherein said transverse stem member comprises a stem proximal edge and a stem distal edge; wherein the distance said stem distal edge extends from said underside is greater than the distance said stem proximal edge extends from said underside to support said platform at an angle; and
  a curved securing member disposed between and fixedly connecting said transverse bar securing member and said push bar securing member; wherein said curved securing member comprises a semi-cylindrical transverse member.

10. A holder accessory for a shopping cart handlebar in which the cart handlebar has a cart push bar portion and opposing cart transverse bar portions, the holder accessory comprising:
  a support platform having a substantially planar upper surface, a proximal edge, a distal edge, a right lateral edge, a left lateral edge, and an underside; wherein said support platform comprises an upwardly extending ledge disposed at or near said proximal edge; wherein said support platform further comprises a retention member disposed at or near said distal edge of said platform;
  a push bar securing member fixedly attached to a proximal portion of said underside of said support platform and comprising a semi-cylindrical push bar member that is attachable around said cart push bar portion of said handlebar; wherein said push bar securing member extends along substantially the length of said cart push bar portion; and a transverse bar securing member comprising a transverse stem member and a semi-cylindrical transverse member; wherein said transverse stem member is fixedly attached to said underside of said support platform at a location distal to the location of attachment of said push bar securing member; wherein said semi-cylindrical transverse member is attachable around one of said opposing cart transverse bar portions of said handlebar; wherein said transverse stem member comprises a stem proximal edge and a stem distal edge; wherein the distance said stem distal edge extends from said underside is greater than the distance said stem proximal edge extends from said underside to support said platform at an angle.

11. The holder accessory for a shopping cart handlebar as recited in claim 1, wherein said support platform comprises an upwardly extending ledge disposed at or near said proximal edge of said support platform.

12. The holder accessory for a shopping cart handlebar as recited in claim 2, wherein said support platform comprises an upwardly extending ledge disposed at or near said proximal edge of said support platform.

13. The holder accessory for a shopping cart handlebar as recited in claim 3, wherein said support platform comprises an upwardly extending ledge disposed at or near said proximal edge of said support platform.

14. The holder accessory for a shopping cart handlebar as recited in claim 4, wherein said support platform comprises an upwardly extending ledge disposed at or near said proximal edge of said support platform.

15. The holder accessory for a shopping cart handlebar as recited in claim 7, wherein said support platform comprises an upwardly extending ledge disposed at or near said proximal edge of said support platform.

16. The holder accessory for a shopping cart handlebar as recited in claim 8, wherein said support platform comprises an upwardly extending ledge disposed at or near said proximal edge of said support platform.

17. The holder accessory for a shopping cart handlebar as recited in claim 9, wherein said support platform comprises an upwardly extending ledge disposed at or near said proximal edge of said support platform.

18. The holder accessory for a shopping cart handlebar as recited in claim 10, wherein said support platform comprises an upwardly extending ledge disposed at or near said proximal edge of said support platform.

* * * * *